(12) United States Patent
Kotrba et al.

(10) Patent No.: US 7,743,501 B2
(45) Date of Patent: Jun. 29, 2010

(54) FLUID BEARING ASSISTED ASSEMBLY OF AN EXHAUST TREATMENT DEVICE

(75) Inventors: Adam J Kotrba, Laingsburg, MI (US); Keith G Olivier, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 776 days.

(21) Appl. No.: 11/644,024

(22) Filed: Dec. 21, 2006

(65) Prior Publication Data

US 2007/0148057 A1    Jun. 28, 2007

Related U.S. Application Data

(60) Provisional application No. 60/754,586, filed on Dec. 28, 2005.

(51) Int. Cl.
    *B21D 51/16*      (2006.01)

(52) U.S. Cl. .............................. 29/890; 29/464; 29/468; 29/446; 29/222; 29/252

(58) Field of Classification Search .................. 29/464, 29/468, 446, 232, 726, 890, 252, 700, 222
See application file for complete search history.

(56) References Cited

U.S. PATENT DOCUMENTS

| 4,756,293 A | 7/1988 | Suzuki et al. |
|---|---|---|
| 6,732,432 B2 | 5/2004 | Foster et al. |
| 2003/0000088 A1 | 1/2003 | Mayfield |
| 2003/0131743 A1 | 7/2003 | Sauer et al. |
| 2005/0154450 A1* | 7/2005 | Larson et al. .............. 623/1.42 |

* cited by examiner

*Primary Examiner*—David P Bryant
*Assistant Examiner*—Christopher Besler
(74) *Attorney, Agent, or Firm*—Harness, Dickey & Pierce, P.L.C.

(57) ABSTRACT

Apparatus for inserting a substrate surrounded by a compressible mat into a compartment of a housing of an exhaust treatment device includes an insertion member having a bore shaped substantially identically to a shape of an opening to the housing compartment and a fluid bearing generator establishing a compressed fluid bearing at a surface of the bore. The fluid bearing is operative to reduce a coefficient of friction between the compressible mat and a surface of the bore when the substrate/mat combination is moved axially in the bore into the compartment opening.

15 Claims, 6 Drawing Sheets

FLUID BEARING ASSISTED ASSEMBLY OF AN EXHAUST TREATMENT DEVICE

BACKGROUND

The invention relates generally to assembly of exhaust treatment devices, such as catalytic converters. More specifically, the invention concerns substrate insertion apparatus utilizing a compressed fluid bearing.

Gas, e.g., exhaust gas, treatment devices such as catalytic converters, evaporative emission devices, scrubbing devices, diesel particulate traps, and the like are employed in various applications to physically and/or catalytically treat environmentally unfriendly gas emission. Such gas treatment devices typically incorporate a substrate or brick which includes catalyst coating. A mounting device such as a support mat comprising a compressible material is typically disposed about the substrate forming a mat support material/substrate subassembly prior to being inserted into a housing compartment of the gas treatment device.

One conventional method for inserting a mat/substrate combination into the housing compartment comprises using a stuffing cone, such as disclosed in U.S. Pat. Nos. 6,532,659 and 6,732,432. With devices as shown in these patents, an outlet of the stuffing cone is disposed adjacent to an inlet or opening of the housing compartment. The cone structure has an inner diameter less than the inner diameter of the housing compartment. As the mat/substrate combination moves through the stuffing cone toward the housing compartment, the cone compresses the compressible mat about the substrate so that the subassembly can be disposed into the housing compartment. As the mat/substrate combination slides against the inwardly tapered interior of the stuffing cone, the mat compresses about the substrate until the combination has an outer diameter less than the outer diameter of the housing compartment opening. At this point, the combination is pushed or stuffed into the exhaust treatment device housing.

During this conventional stuffing cone process, the support mat performance is degraded (i.e., its holding forces are reduced) as a result of shear damage to the mat material during the stuffing process. This shear damage is caused principally by the pulling/pushing of the mat during compression and friction between the mat and the stuffing device.

The relationship between stuffing speed and radial compression speed of the mat is fixed by the stuffing cone geometry and cannot be varied independently. The mat is dragged into the narrowing frustoconical device and is therefore subjected to tensile elongation and shear damage. The tensile elongation results in a reduced gap bulk density of the mat and fiber breakage. A coefficient of friction between the stuffing cone and the compressible mat cannot be effectively improved. Films, coatings or lubricant have been employed to reduce friction but have a decidedly negative impact on mat in-service performance.

Hence, there is seen to be a need in the pertinent art for a mat/substrate stuffing or insertion mechanism which minimizes shear damage to the compressible mat by, in turn, minimizing a coefficient of friction between the mat and the insertion device during the stuffing process and independently permitting optimization of compression speed.

SUMMARY OF THE INVENTION

Apparatus for inserting a substrate surrounded by a compressible mat into a compartment of a housing of an exhaust treatment device includes an insertion member having a bore shaped substantially identically to a shape of an opening to the housing compartment and a fluid bearing generator establishing a compressed fluid bearing at a surface of the bore operative to reduce a coefficient of friction between the compressible mat and a surface of the bore when the substrate surrounded by the compressible mat is moved within the bore.

In another aspect of the invention, a method of inserting a substrate surrounded by a compressible mat into a compartment of a housing of an exhaust treatment device begins by positioning an adjustable insertion member adjacent to an opening into the compartment of the housing of the exhaust treatment device. The substrate and mat are positioned into a bore of the adjustable insertion member. The insertion member is adjusted such that a cross-sectional area of the bore assumes a shape substantially identical to, but smaller than, a cross-sectional area of the opening of the compartment thereby compressing the mat. A compressed fluid bearing is then established between the mat and a wall of the bore, and the substrate and mat combination are moved from the bore into the compartment through the opening.

BRIEF DESCRIPTION OF THE DRAWING

The objects and features of the invention will become apparent from a reading of a detailed description, taken in conjunction with the drawing, in which.

DETAILED DESCRIPTION

It has been found that the shear damage associated with use of a conventional stuffing cone may be minimized or even eliminated by compressing the support mat entirely before stuffing it into the compartment of an exhaust treatment device (without over compression). Further reduction of shear damage occurs when a coefficient of friction is minimized, particularly during initial slip conditions. A segmented tool is proposed with a compressed fluid, such as air, forced through it onto the mat interface surface, thereby creating an air layer or bearing which will minimize stuffing forces and essentially eliminate shear damage to the mat.

With reference to FIGS. 1-4, an insertion member or stuffing pot 200 is placed adjacent to the housing 104 of an exhaust treatment device for insertion of a substrate 110 surrounded by a compressible support mat 108 into the exhaust treatment device.

Figure 1:
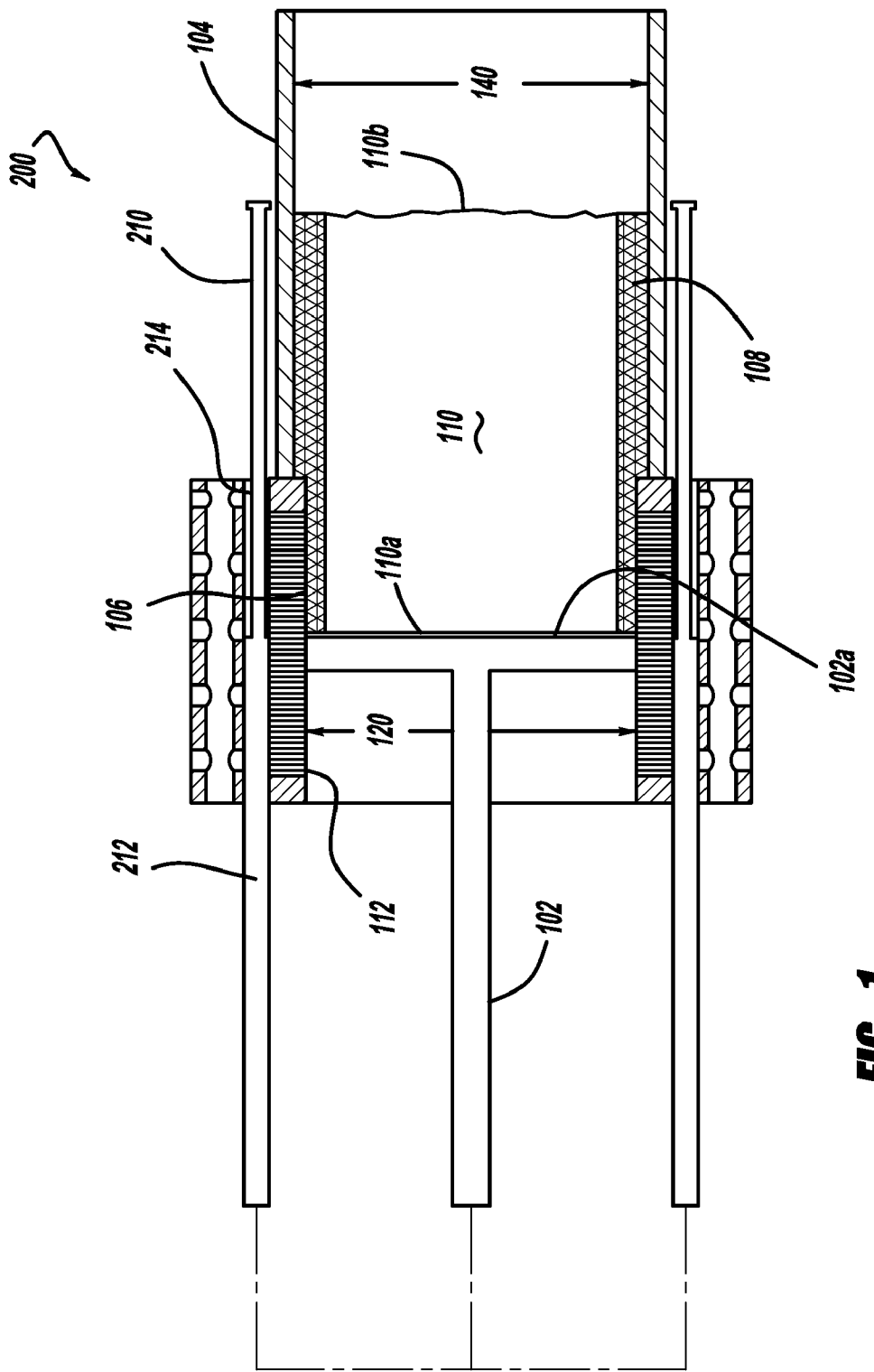
FIG. 1 is a cross-sectional view of an exhaust treatment device being assembled with insertion apparatus arranged in accordance with the principles of the invention.
Figure 2A:
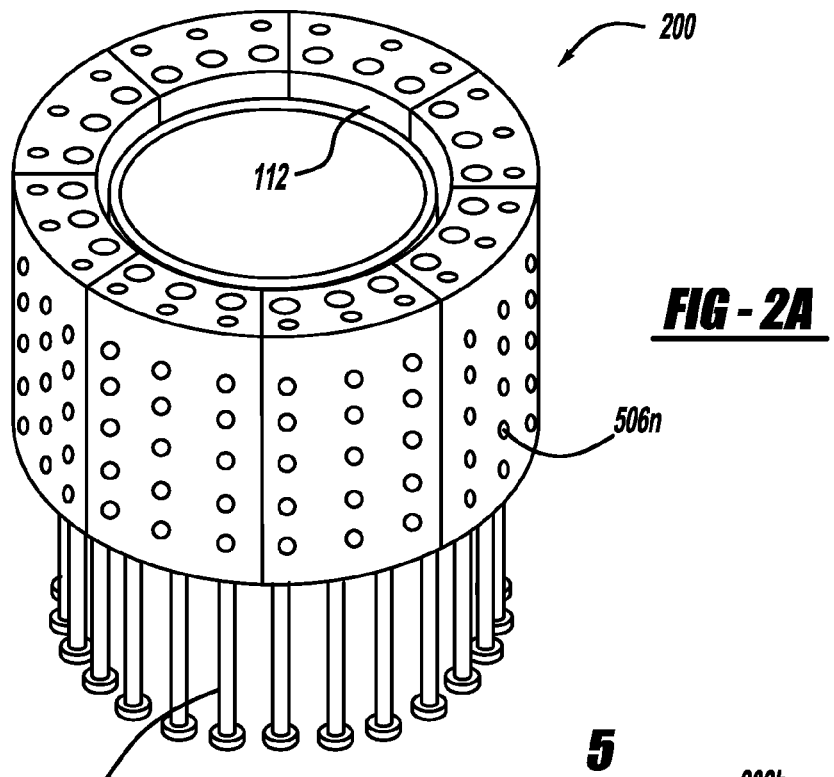
FIG. 2A is a perspective view of the insertion apparatus in a closed state around a substrate with surrounding support mat.
Figure 2B:
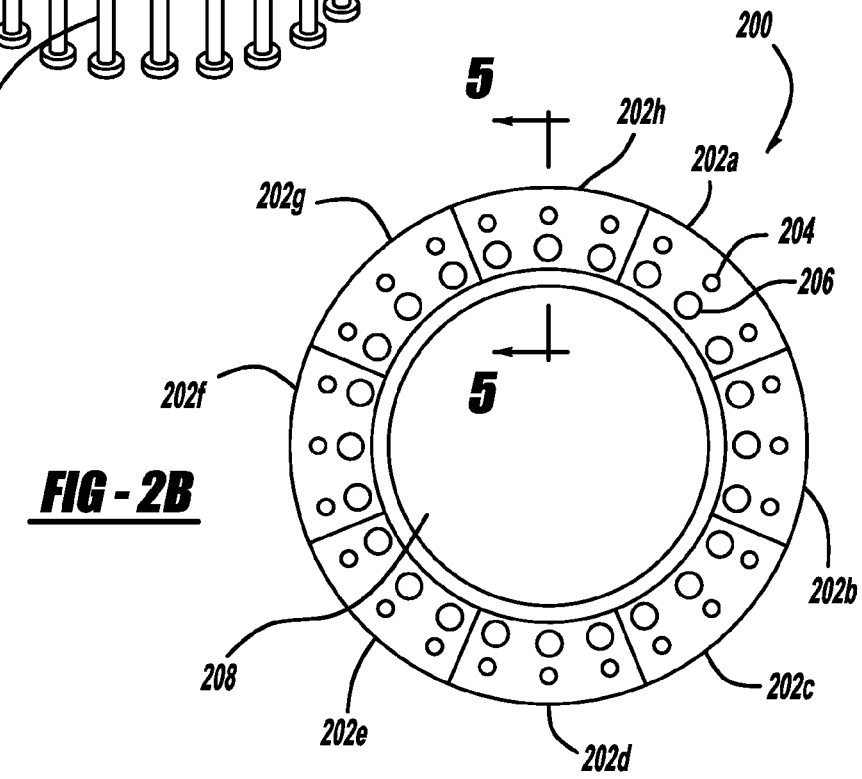
FIG. 2B is a cross-sectional view of the insertion apparatus of FIG. 2A.

Insertion device 200 is comprised of a plurality, such as eight, radially adjustable segments or jaws 202a-h which define a bore 112 (FIG. 1) for receipt of the substrate/mat combination 208 (FIGS. 2A, 2B). Insertion member 200 is shown in its radially closed or compressing state in FIGS. 2A and 2B. The device 200 is shown in its radially expanded or open state in FIGS. 3A and 3B.

This segmented jaw design defines a bore 112 (FIG. 1) having a cross-sectional shape substantially identical to a shape of the opening into the compartment defined by exhaust treatment device housing 104. In its radially innermost adjustable position, device 200 exhibits a negligible gap between the jaw segments 202. An electrical or hydraulic actuator for the jaw segments may be synchronized by a pair of cam plates (not shown). A higher cost alternative to adjusting the jaw segments would be individual actuators for each jaw segment 202a-h.

As seen in FIGS. 2A, 2B, 3A and 3B, each segment or jaw includes a plurality of pairs of axially extending passages, each pair including a first passage 204 adapted to be in fluid communication with a supply of compressed fluid, such as compressed air, and a second passage 206 for receipt of a metering rod 210. The opening of passages 206 in segments 202 are provided with seals (not shown) for engaging rods 210 and maintaining internal pressure inside segments 202 as the metering rods translate therein.

As seen from FIG. 1, each metering rod 210 includes a narrow portion 214 and a wider portion 212. Each metering rod 210 is additionally coupled to an insertion ram 102 for simultaneous movement therewith.

Insertion ram 102 includes an engagement surface 102a for applying pressure to an end 110a of the substrate/mat combination. The transition point between the narrow portion 214 and the wide portion 212 of each metering rod is substantially in alignment with the engagement surface 102a of ram 102 for a purpose to be described in a later section of this description.

Figure 4:
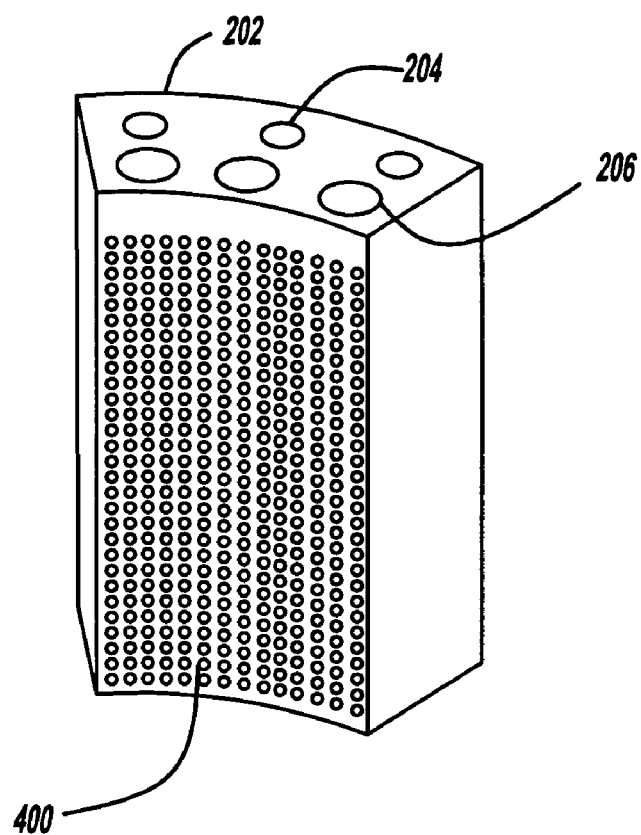
FIG. 4 is a perspective view of one of the radially adjustable segments of the insertion apparatus.

As seen from FIG. 4, a radially innermost surface of each segment which helps define bore 112 of FIG. 1, includes a plurality of perforations 400 in fluid communication with the pairs of axially extending passages 204, 206.

Figure 5:
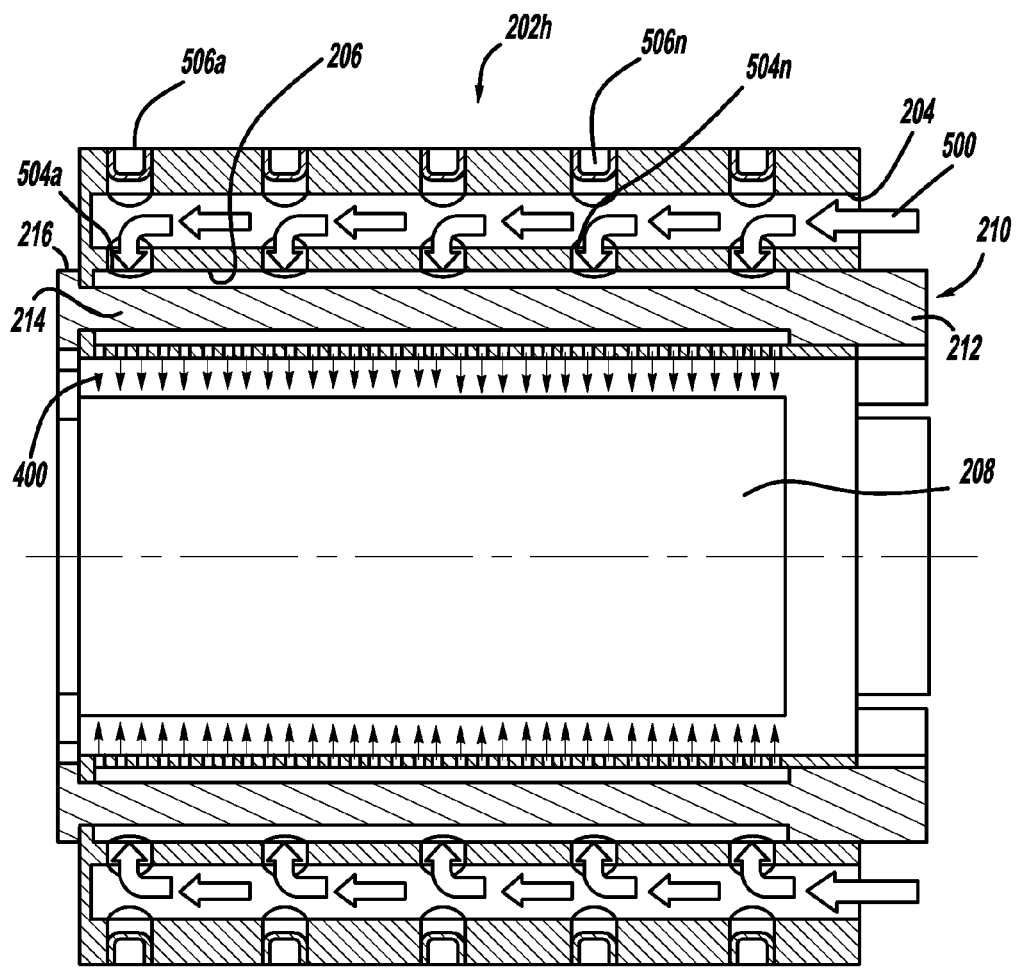
FIG. 5 is a cross-sectional view of the insertion apparatus at the beginning of the insertion process.

With reference now to FIG. 5, the first or compressed fluid supply passage 204 and the second or metering passage 206 are substantially parallel as they extend axially along insertion member 200. Passages 204 and 206 are in fluid communication with one another via a plurality of radially extending ports 504a, b, etc. Ports 504 are formed by drilling through an outer surface of each segment or jaw 202 of device 200, and then the resulting opening in the outer surface is sealed via a like plurality of plugs 506a, b, . . . n, etc., for ease of manufacture.

Each metering rod 210 has an end cap 216 engaging an end of device 200 at the initiation of an insertion process. Narrow portion 204 provides a clearance around this portion as the rod lies in passage 206 thereby enabling the flow of compressed fluid 500 axially along passage 204 and into the radially extending ports 504 and thence through the plurality of perforations 400 in the segment wall for supplying the air bearing to the support mat surface.

Figure 6:
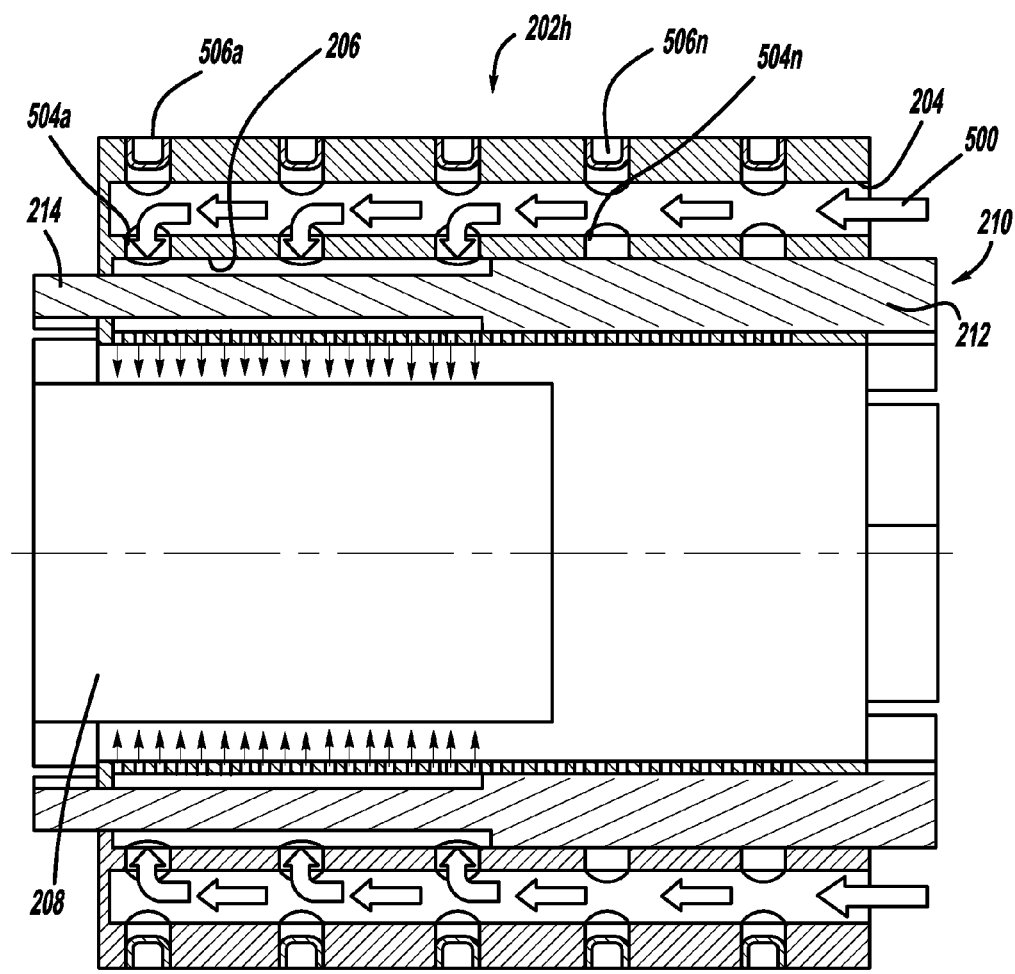
FIG. 6 is a cross-sectional view of the insertion apparatus in the middle of the insertion process.

The wide portion 212 of each metering rod 210 as it moves to the left in FIGS. 5 and 6, selectively blocks ports 504 adjacent to the wider portion 212 to establish the air bearing 106 only along that portion of the surface of bore 112 which still contains the substrate/mat combination being inserted into the exhaust treatment device housing.

FIG. 5 shows the metering rod positions at the beginning of the insertion process, while FIG. 6 shows the metering rods 210 having been moved towards the left during the insertion process to thereby block a portion of the radially extending ports 504 since the periphery of the rod portion 212 is in sliding engagement with a wall of passage 206.

Returning to FIG. 1, it is seen that the diameter 120 of the bore 112 of the insertion device 200 is configured at the innermost radial position of segments 202 to be smaller than the diameter 140 of the compartment defined by exhaust treatment housing 104.

Figure 3A:
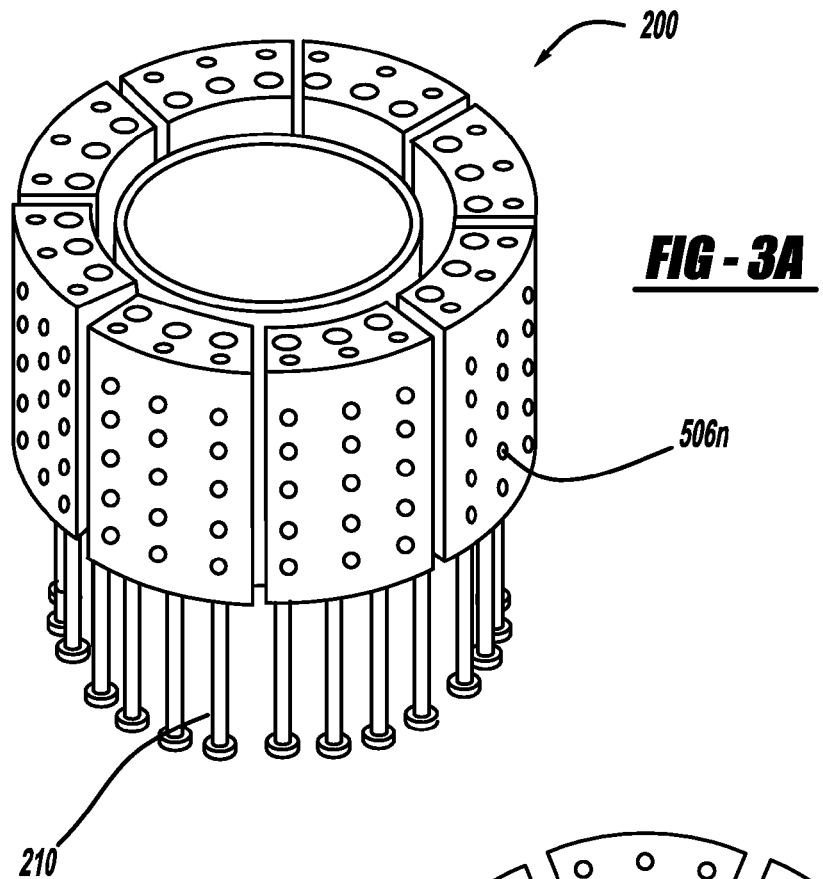
FIG. 3A is a perspective view of the insertion apparatus in an open or enlarged state for receipt of the substrate/mat combination.
Figure 3B:
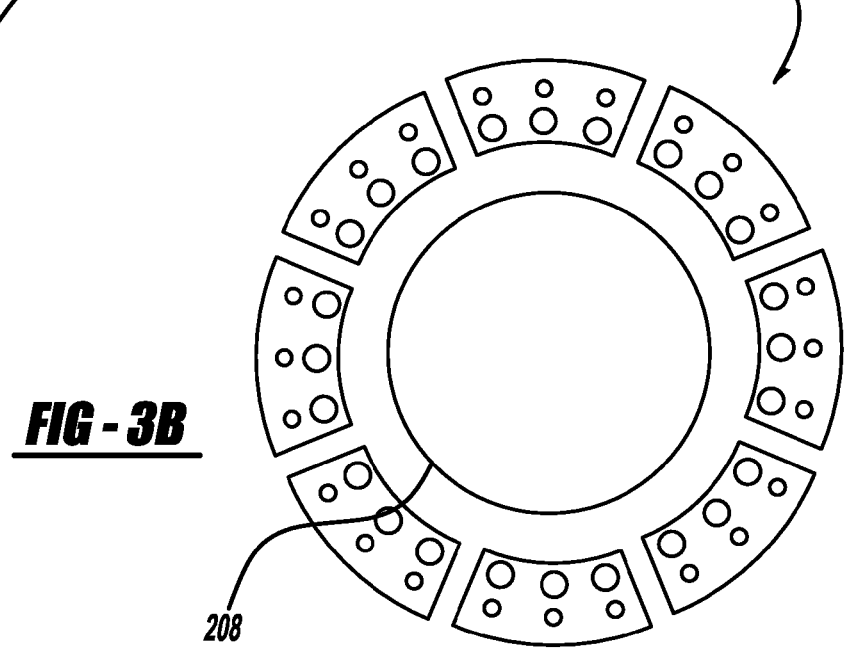
FIG. 3B is a cross-sectional view of the apparatus of FIG. 3A.

In operation, the wrapped substrate/mat combination 208 is inserted and lowered onto an end stop at an end of bore 112 of insertion device 200 which has been expanded to its radially outermost bore as shown in FIGS. 3A and 3B. The device 200 is then activated and moves the segments radially inwardly to compress the mat 108 by closing all the jaw segments 202, as shown in FIGS. 2A, 2B. The radial closure is performed in accordance with a preselected velocity profile having a high initial speed and then tapering down to a final speed as the final geometry is approached. A wait state may be optionally programmed to permit peak pressures on the mat to subside, but this is not required if a suitable velocity profile is used in the first place.

The air bearing air supply is then activated resulting in a fluid bearing 106 forming between mat 108 and the wall of bore 112 defined by jaw segments 202. When the fluid or air pressure has stabilized, the substrate 110 and mat 108 are stuffed by ram 102 into the compartment of the exhaust treatment device housing 104 with relatively low force. Metering rods 210 which are coupled to the ram 102 slide simultaneously axially into the passages 206 thereby ensuring that fluid pressure is applied only to the area of bore 112 remaining in contact with mat 108, thus ensuring stable pressure of the air bearing 106.

It will be appreciated by those skilled in the art that the invention permits independent optimization of compression of the mat, thus offering the possibility of significantly reduced peak pressures and hence less fiber breakage and higher mat performance. The coefficient of friction between the mat and the wall of the insertion device is substantially reduced. The fluid bearing is created between the compressed mat and the compression jaws of the insertion device to reduce this coefficient. This reduction, in turn, reduces push-in forces and hence fiber breakage to shear damage. Additionally, tensile elongation of the support mat during the insertion process will be substantially reduced, in turn, leading to a reduced adverse effect on gap bulk density of the mat and damage to its fibers. Finally, the device of this invention will provide performance advantage without increased costs while eliminating the need for film backing, coatings or lubricant. The invention also enables the use of thicker, low density mats which may reduce costs further.

The invention has been disclosed in conjunction with a detailed description given solely for the sake of example. The scope and spirit of the invention are derived from appropriate interpretation of the appended claims.

What is claimed is:

1. Apparatus for inserting a substrate surrounded by a compressible mat into a compartment of a housing of an exhaust treatment device, the apparatus comprising:

an insertion member having a bore shaped substantially similarly to a shape of an opening to the housing compartment and a fluid bearing generator establishing a compressed fluid bearing at a surface of the bore operative to reduce a coefficient of friction between the compressible mat and a surface of the bore when the substrate surrounded by the compressible mat is moved within the bore; and a metering rod for adjustably establishing the fluid bearing only along a portion of the bore carrying the substrate and mat.

2. The apparatus of claim 1 further comprising an insertion ram having an engagement surface arranged to contact an end of the substrate and mat for axially inserting the substrate and mat into the housing compartment while the mat is compressed by the fluid bearing.

3. The apparatus of claim 2 wherein the metering rod is fixed for translation with the insertion ram.

4. The apparatus of claim 1 wherein the fluid comprises air.

5. The apparatus of claim 1 wherein the exhaust treatment device comprises a catalytic converter.

6. The apparatus of claim 1 wherein the insertion member bore comprises a plurality of radially translatable segments operative at a radially innermost position of the segments to at least partially compress the mat; and each segment further comprising an axially extending fluid passage adapted for fluid communication with a source of compressed fluid and a port providing fluid communication between the passage and the bore.

7. The apparatus of claim 6 wherein each segment further comprises:

a metering passage extending substantially parallel to a corresponding fluid passage and carrying the metering rod having a wide portion substantially filling the metering passage to block fluid flow through the port and a narrow portion providing clearance enabling fluid flow through the port.

8. The apparatus of claim 7 further comprising an axially translatable insertion ram coupled to the metering rod and having an engagement surface arranged to contact an end of the substrate for axially inserting the substrate and mat into the housing compartment via the insertion element while simultaneously axially translating the metering rod through the metering passage.

9. The apparatus of claim 8 wherein a transition on the metering rod from the narrow portion to the wide portion is positioned substantially at the plane of the end of the substrate in contact with the engagement surface of the insertion ram.

10. The apparatus of claim 6 wherein the port provides fluid communication between the passage and the bore via a plurality of perforations in a wall of a corresponding segment facing the bore.

11. The apparatus of claim 6 wherein each radially translatable segment further comprises a pair of axially extending passages, a first passage of the pair in fluid communication with a source of compressed fluid, a second passage of the pair carrying the metering rod having a first portion providing clearance with a wall of the second passage and a second portion in sliding engagement with the wall of the second passage, the first and second passages having a plurality of ports providing fluid communication between the first and second passages, and a plurality of perforations in an inner wall of the segment providing fluid communication between the bore of the segmented insertion member and the second passage; and an axially translatable insertion ram coupled to the metering rod and having an engagement surface arranged to contact an end of the substrate and mat for axially inserting the substrate mat into the housing compartment from the segmented insertion member while simultaneously axially translating the metering rod along the second passage.

12. Apparatus for inserting a substrate surrounded by a compressible mat into a compartment of a housing of an exhaust treatment device, the apparatus comprising:

an insertion member having radially moveable segments adapted to engage an outer surface of the mat and compress the mat, and a fluid bearing generator operable to establish a compressed fluid bearing between the segments and the mat after the mat has been compressed by the segments, the fluid bearing being operative to reduce a coefficient of friction between the compressible mat and the segments, wherein each segment includes an axially extending fluid passage in communication with ports extending through an innermost radial surface of the segment, and a metering passage extending substantially parallel to a corresponding fluid passage and carrying an axially translatable metering rod having a wide portion substantially filling the metering passage to block fluid flow through the ports and a narrow portion providing clearance enabling fluid flow through the ports.

13. The apparatus of claim 12 further comprising an insertion ram having an engagement surface arranged to contact an end of the substrate and mat for axially inserting the substrate and mat into the housing compartment while the mat is compressed by the fluid bearing.

14. The apparatus of claim 13 wherein the insertion element simultaneously axially translates with the metering rod.

15. The apparatus of claim 12 wherein the metering rod adjustably establishes the fluid bearing only along a portion of the insertion member carrying the substrate and mat.

* * * * *